(12) United States Patent
Overhultz et al.

(10) Patent No.: US 7,614,556 B2
(45) Date of Patent: Nov. 10, 2009

(54) DISTRIBUTED RFID ANTENNA ARRAY UTILIZING CIRCULAR POLARIZED HELICAL ANTENNAS

(75) Inventors: Gary L. Overhultz, River Forest, IL (US); Gordon E. Hardman, Boulder, CO (US); John W. Pyne, Erie, CO (US); Edward J. Strazdes, Lafayette, CO (US)

(73) Assignee: Goliath Solutions, LLC, Chicago, IL (US)

( * ) Notice: Subject to any disclaimer, the term of this patent is extended or adjusted under 35 U.S.C. 154(b) by 311 days.

(21) Appl. No.: 11/417,768

(22) Filed: May 4, 2006

(65) Prior Publication Data

US 2006/0208080 A1    Sep. 21, 2006

Related U.S. Application Data

(63) Continuation-in-part of application No. PCT/US2005/037138, filed on Oct. 18, 2005.

(60) Provisional application No. 60/625,273, filed on Nov. 5, 2004.

(51) Int. Cl.
   G06K 7/08    (2006.01)
   G06K 19/00   (2006.01)
   G06K 19/06   (2006.01)
   H01Q 1/36    (2006.01)
   G08B 13/14   (2006.01)

(52) U.S. Cl. .................. 235/451; 235/487; 235/492; 235/493; 343/895; 340/572.1; 340/572.7

(58) Field of Classification Search ......... 235/378–380, 235/385, 451, 487, 492, 493; 340/572.1, 340/572.3, 572.7; 705/22, 20, 25, 64, 451, 705/487, 492, 493; 343/895, 572.1, 572.7
See application file for complete search history.

(56) References Cited

U.S. PATENT DOCUMENTS 3,569,979 A * 3/1971 Benedikt et al. ............ 343/895

(Continued)

FOREIGN PATENT DOCUMENTS

WO    WO 2004/086337 A2    10/2004

OTHER PUBLICATIONS

Tyco Electronics—Slimline RFID Antenna—Japan, Dual Circular Polarized, 950-956 MHZ, Product Specification.

(Continued)

*Primary Examiner*—Daniel Walsh
(74) *Attorney, Agent, or Firm*—Jones Day

(57) ABSTRACT

In accordance with the teachings described herein, RFID systems are provided that include a distributed RFID antenna array utilizing one or more circular polarized helical antennas. A plurality of RFID tags may be used, with each RFID tag including a linear polarized antenna for communicating RFID tag signals. One or more receiver antennas may be used for receiving the RFID tag signals from the RFID tags. An RFID tag signal reader may be used to process RFID tag signals received by the receiver antennas. In one example, the receiver antennas may include a circular polarized helical antenna element. One or more transmitter antennas may be used for transmitting an RF signal to the plurality of RFID tags, the transmitter antennas including a circular polarized helical antenna element. A transmitter may be used to generate the RF signal for transmission by the transmitter antennas. In one example, the RFID tag signal reader and the transmitter may be included in a single reader/transmitter unit.

26 Claims, 10 Drawing Sheets

U.S. PATENT DOCUMENTS

| | | | | |
|---|---|---|---|---|
| 3,737,912 A * | 6/1973 | Cribb | | 343/880 |
| 3,757,345 A * | 9/1973 | Carver | | 343/786 |
| 3,836,979 A * | 9/1974 | Kurland et al. | | 343/881 |
| 3,906,509 A * | 9/1975 | DuHamel | | 343/895 |
| 5,081,469 A * | 1/1992 | Bones | | 343/895 |
| 5,170,176 A * | 12/1992 | Yasunaga et al. | | 343/895 |
| 5,287,266 A | 2/1994 | Malec et al. | | |
| 5,313,216 A | 5/1994 | Wang et al. | | |
| 5,329,287 A * | 7/1994 | Strickland | | 343/752 |
| 5,493,107 A | 2/1996 | Gupta et al. | | |
| 5,572,226 A | 11/1996 | Tuttle | | |
| 5,608,413 A * | 3/1997 | Macdonald | | 343/700 MS |
| 5,612,707 A * | 3/1997 | Vaughan et al. | | 343/895 |
| 5,719,586 A | 2/1998 | Tuttle | | |
| 5,771,005 A | 6/1998 | Goodwin | | |
| 5,793,029 A | 8/1998 | Goodwin | | |
| 5,838,282 A * | 11/1998 | Lalezari et al. | | 343/727 |
| 5,872,549 A * | 2/1999 | Huynh et al. | | 343/895 |
| 5,892,480 A * | 4/1999 | Killen | | 343/895 |
| 5,896,113 A * | 4/1999 | O'Neill, Jr. | | 343/895 |
| 5,909,196 A * | 6/1999 | O'Neill, Jr. | | 343/895 |
| 5,923,252 A | 7/1999 | Sizer et al. | | |
| 5,986,621 A * | 11/1999 | Barts et al. | | 343/895 |
| 6,011,524 A * | 1/2000 | Jervis | | 343/895 |
| 6,069,564 A | 5/2000 | Hatano et al. | | |
| 6,075,501 A * | 6/2000 | Kuramoto et al. | | 343/895 |
| 6,118,379 A * | 9/2000 | Kodukula et al. | | 340/572.8 |
| 6,215,402 B1 * | 4/2001 | Rao Kodukula et al. | | 340/572.8 |
| 6,253,190 B1 | 6/2001 | Sutherland | | |
| 6,360,138 B1 | 3/2002 | Coppola et al. | | |
| 6,373,448 B1 * | 4/2002 | Chun | | 343/895 |
| 6,396,438 B1 | 5/2002 | Seal | | |
| 6,421,028 B1 * | 7/2002 | Ohgren et al. | | 343/895 |
| 6,552,661 B1 | 4/2003 | Lastinger | | |
| 6,601,764 B1 | 8/2003 | Goodwin | | |
| 6,610,379 B1 | 8/2003 | Adams et al. | | |
| 6,669,089 B2 | 12/2003 | Cybulski et al. | | |
| 6,669,092 B2 | 12/2003 | Leanheart et al. | | |
| 6,693,539 B2 | 2/2004 | Bowers et al. | | |
| 6,693,541 B2 | 2/2004 | Egbert | | |
| 6,696,920 B1 | 2/2004 | Goodwin et al. | | |
| 6,715,675 B1 | 4/2004 | Rosenfeld | | |
| 6,736,316 B2 | 5/2004 | Neumark | | |
| 6,747,560 B2 | 6/2004 | Stevens | | |
| 6,749,116 B2 | 6/2004 | Massaro | | |
| 6,768,419 B2 | 7/2004 | Garber et al. | | |
| 6,784,850 B2 * | 8/2004 | Morooka et al. | | 343/895 |
| 6,796,508 B2 | 9/2004 | Muller | | |
| 6,824,065 B2 | 11/2004 | Boone et al. | | |
| 6,826,554 B2 | 11/2004 | Sone | | |
| 6,827,256 B2 | 12/2004 | Stobbe | | |
| 6,840,440 B2 | 1/2005 | Uozumi et al. | | |
| 6,843,415 B2 | 1/2005 | Vogler | | |
| 6,848,616 B2 | 2/2005 | Tsirline et al. | | |
| 6,867,747 B2 * | 3/2005 | Price et al. | | 343/895 |
| 6,897,827 B2 | 5/2005 | Semba et al. | | |
| 6,922,179 B2 * | 7/2005 | McCollum | | 343/895 |
| 6,943,688 B2 | 9/2005 | Chung et al. | | |
| 6,951,305 B2 | 10/2005 | Overhultz et al. | | |
| 6,956,538 B2 | 10/2005 | Moore | | |
| 7,030,762 B2 * | 4/2006 | Hartmann et al. | | 340/572.7 |
| 7,151,505 B2 * | 12/2006 | Jostell et al. | | 343/895 |
| 7,423,516 B2 * | 9/2008 | Overhultz | | 340/10.5 |
| 2001/0009005 A1 * | 7/2001 | Godin et al. | | 705/37 |
| 2001/0013018 A1 * | 8/2001 | Awano | | 705/41 |
| 2001/0045916 A1 * | 11/2001 | Noro et al. | | 343/895 |
| 2002/0008632 A1 * | 1/2002 | Clothier | | 340/825.37 |
| 2002/0011967 A1 | 1/2002 | Goff et al. | | |
| 2002/0018026 A1 * | 2/2002 | Noro | | 343/895 |
| 2002/0018880 A1 * | 2/2002 | Young | | 428/209 |
| 2002/0077973 A1 * | 6/2002 | Ronchi et al. | | 705/39 |
| 2002/0149539 A1 * | 10/2002 | Noro et al. | | 343/895 |
| 2002/0158803 A1 * | 10/2002 | Hill et al. | | 343/702 |
| 2002/0190845 A1 | 12/2002 | Moore | | |
| 2003/0001005 A1 * | 1/2003 | Risafi et al. | | 235/380 |
| 2003/0016185 A1 * | 1/2003 | Morooka et al. | | 343/895 |
| 2003/0027549 A1 * | 2/2003 | Kiel et al. | | 455/405 |
| 2003/0043985 A1 * | 3/2003 | Wu | | 379/144.05 |
| 2003/0052834 A1 * | 3/2003 | Sievenpiper et al. | | 343/909 |
| 2003/0097302 A1 | 5/2003 | Overhultz et al. | | |
| 2003/0156072 A1 * | 8/2003 | Price et al. | | 343/895 |
| 2003/0174099 A1 | 9/2003 | Bauer et al. | | |
| 2003/0179077 A1 * | 9/2003 | Hartmann et al. | | 340/10.2 |
| 2003/0209601 A1 | 11/2003 | Chung | | |
| 2004/0015417 A1 | 1/2004 | Youngman et al. | | |
| 2004/0027308 A1 * | 2/2004 | Lynch et al. | | 343/895 |
| 2004/0056091 A1 | 3/2004 | Overhultz et al. | | |
| 2004/0058749 A1 * | 3/2004 | Pirritano et al. | | 473/353 |
| 2004/0078332 A1 * | 4/2004 | Ferguson et al. | | 705/41 |
| 2004/0125041 A1 * | 7/2004 | Smith | | 343/895 |
| 2004/0160322 A1 * | 8/2004 | Stilp | | 340/572.1 |
| 2005/0012613 A1 * | 1/2005 | Eckstein et al. | | 340/539.13 |
| 2005/0134506 A1 * | 6/2005 | Egbert | | 343/700 MS |
| 2005/0156806 A1 * | 7/2005 | Ohta et al. | | 343/834 |
| 2005/0237157 A1 * | 10/2005 | Cooper et al. | | 340/10.2 |
| 2005/0242950 A1 * | 11/2005 | Lindsay et al. | | 340/539.26 |
| 2005/0258955 A1 | 11/2005 | Gloekler et al. | | |
| 2005/0258966 A1 | 11/2005 | Wuan | | |
| 2005/0264468 A1 * | 12/2005 | Yegin et al. | | 343/895 |
| 2005/0280539 A1 * | 12/2005 | Pettus | | 340/572.1 |
| 2006/0125653 A1 * | 6/2006 | McQuade | | 340/870.07 |
| 2006/0139172 A1 * | 6/2006 | Waldner et al. | | 340/572.7 |
| 2006/0208080 A1 * | 9/2006 | Overhultz et al. | | 235/451 |
| 2006/0238435 A1 * | 10/2006 | Yegin et al. | | 343/895 |
| 2006/0255949 A1 * | 11/2006 | Roeder et al. | | 340/572.7 |
| 2006/0273900 A1 * | 12/2006 | Posamentier | | 340/572.1 |
| 2006/0273902 A1 * | 12/2006 | Shafer et al. | | 340/572.1 |
| 2007/0085751 A1 * | 4/2007 | Kai et al. | | 343/795 |
| 2007/0108268 A1 * | 5/2007 | Graves et al. | | 235/380 |
| 2007/0146230 A1 * | 6/2007 | Overhultz et al. | | 343/895 |
| 2007/0176839 A1 * | 8/2007 | Kai et al. | | 343/803 |
| 2007/0279311 A1 * | 12/2007 | Kai et al. | | 343/797 |
| 2007/0298846 A1 * | 12/2007 | Greene et al. | | 455/572 |
| 2008/0055043 A1 * | 3/2008 | Webb et al. | | 340/10.1 |
| 2008/0172331 A1 * | 7/2008 | Graves et al. | | 705/41 |
| 2008/0258876 A1 * | 10/2008 | Overhultz et al. | | 340/10.2 |
| 2009/0138397 A1 * | 5/2009 | Sharma | | 705/40 |

OTHER PUBLICATIONS

Texas Instruments, UHF Applications Installation Hints.

* cited by examiner

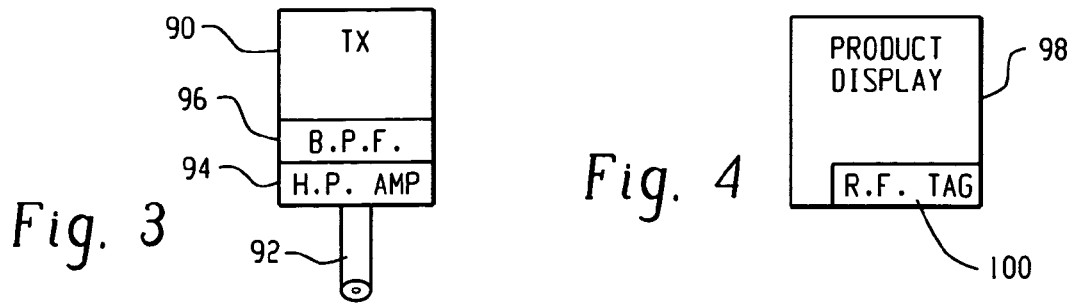
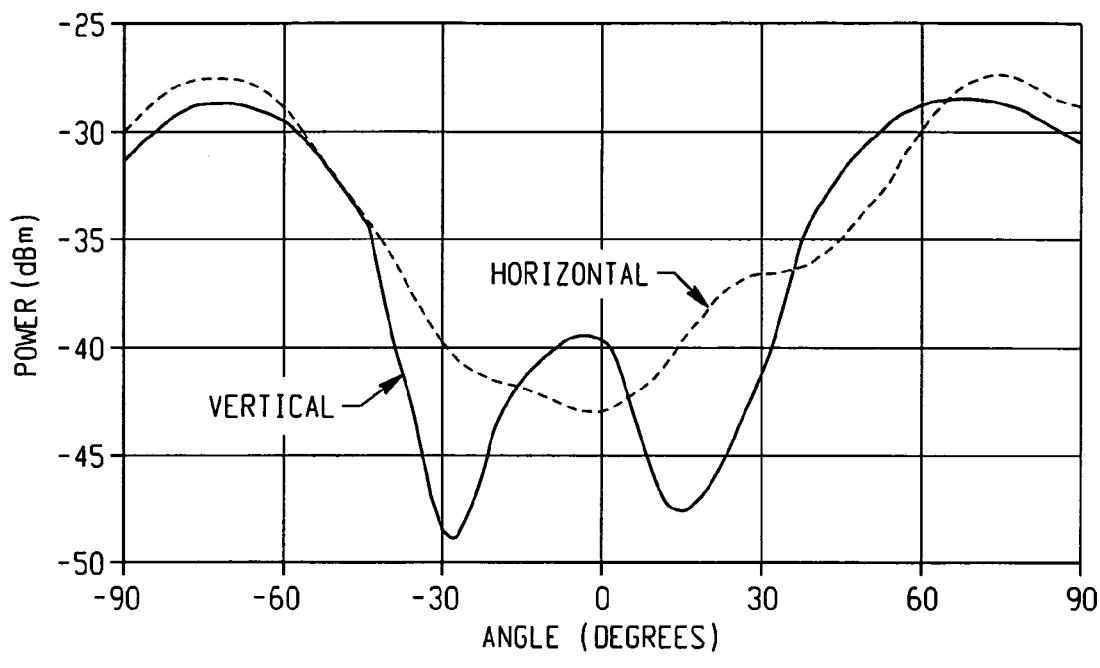
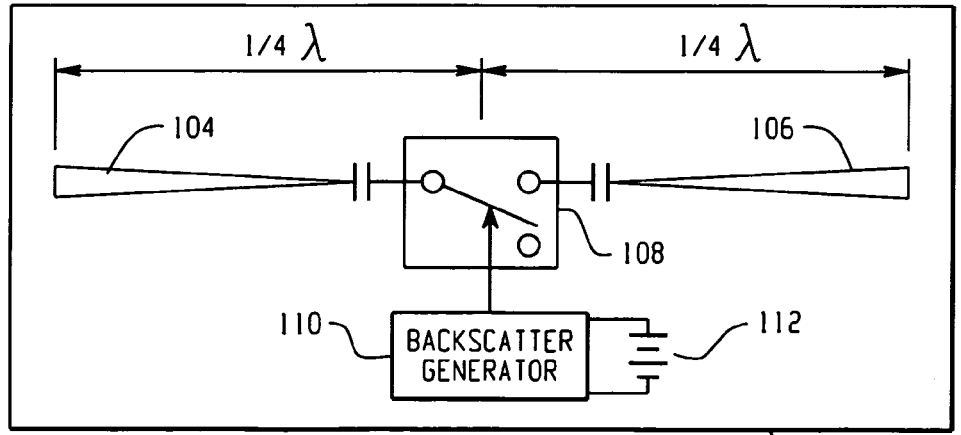

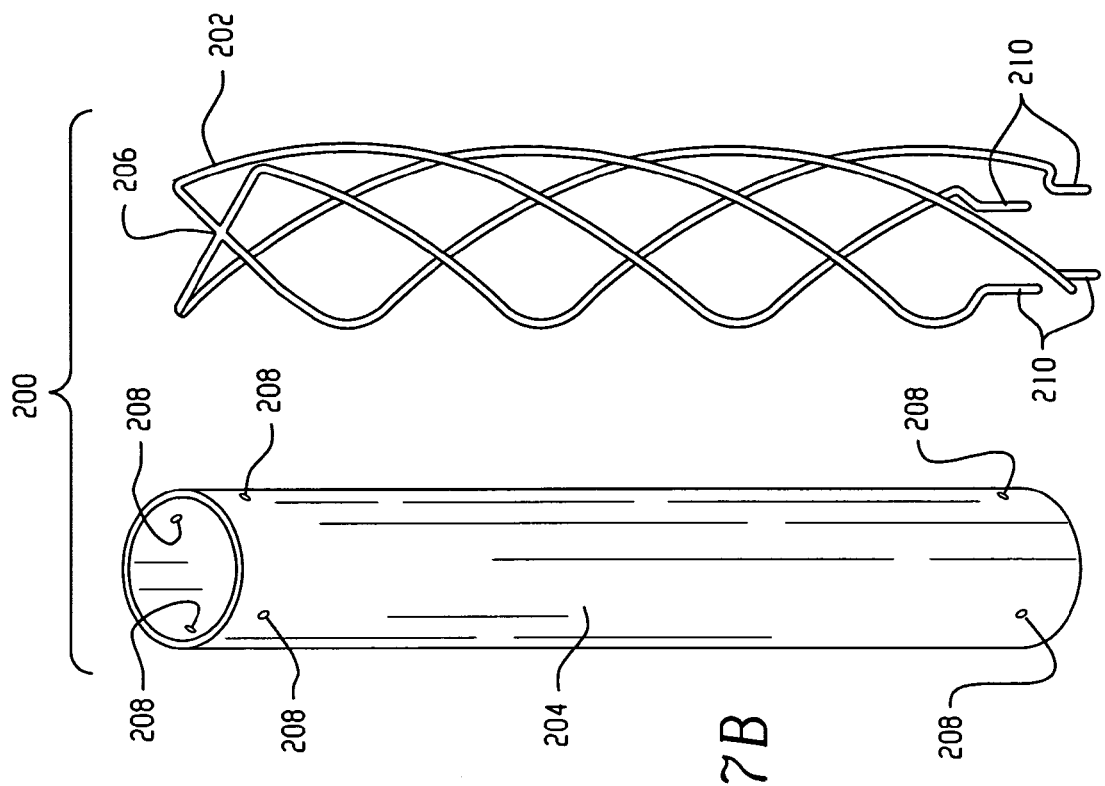
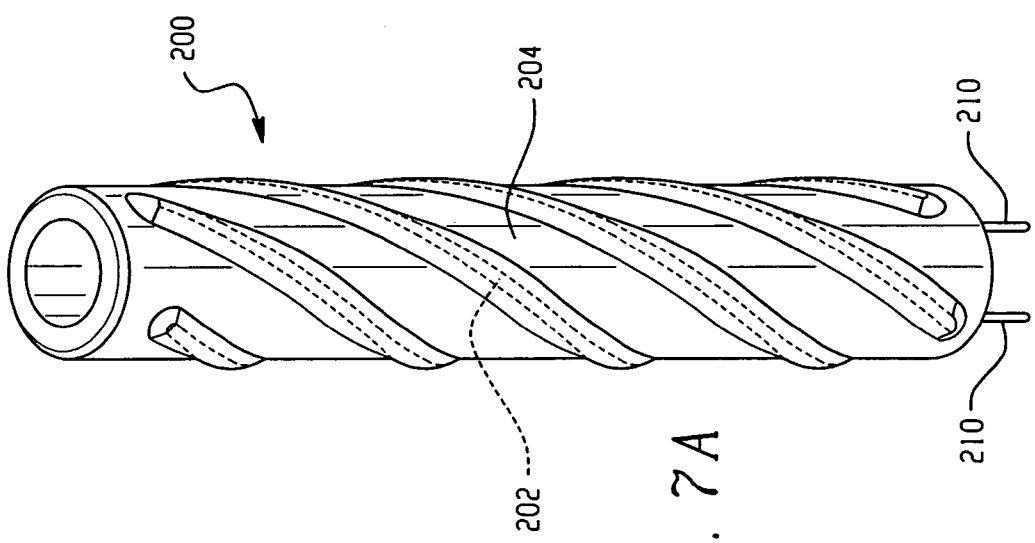
Fig. 7B
Fig. 7A

DISTRIBUTED RFID ANTENNA ARRAY UTILIZING CIRCULAR POLARIZED HELICAL ANTENNAS

CROSS-REFERENCE TO RELATED APPLICATIONS

This application is a continuation-in-part of International Patent Application No. PCT/US05/37138, filed on Oct. 18, 2005, which claims priority from U.S. Provisional Application No. 60/625,273, filed on Nov. 5, 2004. These prior applications are incorporated herein by reference in their entirety.

FIELD

The technology described in this patent document relates generally to radio frequency identification (RFID) systems. More particularly, the patent document describes a distributed RFID antenna array that utilizes one or more circular polarized helical antennas.

BACKGROUND

The RFID system described herein is related to the inventions described in commonly assigned U.S. Patent Application Pub. No. 2004/0056091, which is incorporated herein by reference in its entirety. In that patent application, it was pointed out that a need exists for an advertising compliance monitoring system that provides versatility and flexibility by providing an RFID tag, associated with a specific sign or product display, that communicates tag data to an external reader.

U.S. Patent Application Pub. No. 2004/0056091 describes an RFID system that may include RFID tags of various types (e.g., passive, semi-passive or active), backscatter reader transmitters (BRT), and hubs. Typically, each BRT is a fully self-contained, battery operated unit, and utilizes three antennas. Two medium-gain patch antennas are used to read the tags, and a whip antenna is used to report the received data over a wireless link to the hub. This system functions well and is capable of detecting and reporting tags in a variety of retail environments and at different frequencies. It is desirable, however, to provide an even more economical RFID system by centralizing some or all of the electronics that have been distributed across areas or sub-areas in a given facility, thereby reducing redundancy and cost. It is also desirable to increase the read range of tags by the system to reduce the number of antennas required and to increase the reliability of tags being read under marginal conditions.

SUMMARY

In accordance with the teachings described herein, RFID systems are provided that include a distributed RFID antenna array utilizing one or more circular polarized helical antennas. A plurality of RFID tags may be used, with each RFID tag including a linear polarized antenna for communicating RFID tag signals. One or more receiver antennas may be used for receiving the RFID tag signals from the RFID tags. An RFID tag signal reader may be used to process RFID tag signals received by the receiver antennas. In one example, the receiver antennas may include a circular polarized helical antenna element. One or more transmitter antennas may be used for transmitting an RF signal to the plurality of RFID tags, the transmitter antennas including a circular polarized helical antenna element. A transmitter may be used to generate the RF signal for transmission by the transmitter antennas. In one example, the RFID tag signal reader and the transmitter may be included in a single reader/transmitter unit.

BRIEF DESCRIPTION OF THE DRAWINGS

FIG. 3 depicts an example RF transmitter with a high power amplifier and a band-pass filter.

FIG. 4 depicts an object having an RFID tag associated therewith.

FIG. 5 is a graph illustrating example quadrifiler helix antenna gain patterns to show that the antenna has a low gain on the axis and a high gain on the sides.

FIG. 6 depicts an example switched backscatter tag (SBT) illustrating the manner in which the switch is opened and closed to accept or reject a BRT carrier signal.

FIGS. 7A and 7B depict an example transmitter antenna having a circular polarized quadrifiler helix antenna element.

DETAILED DESCRIPTION

Figure 1:
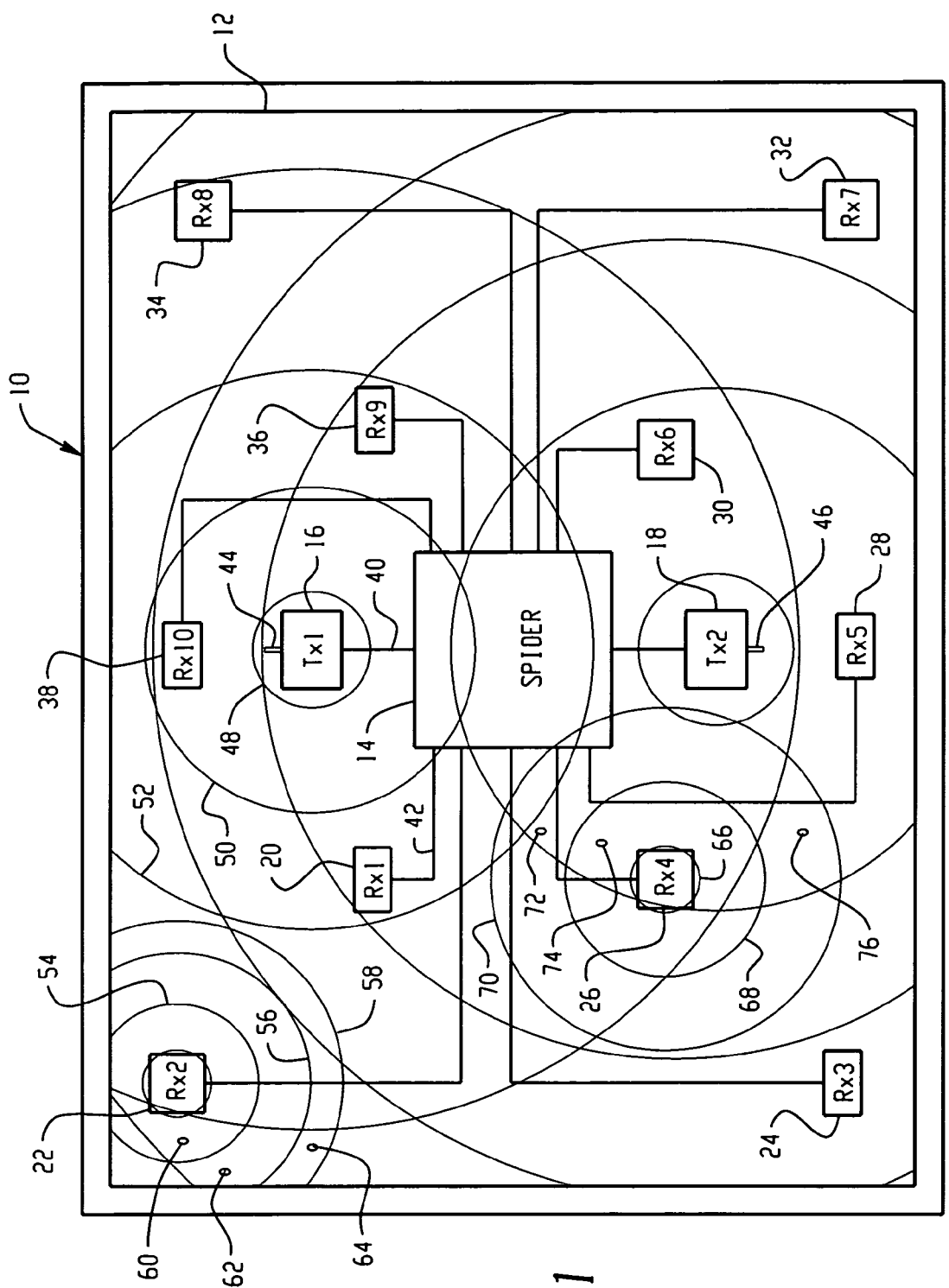
FIG. 1 depicts an example RFID system that includes a BRT hub that covers a designated area such as an entire commercial sales facility.

FIG. 1 depicts an example RFID system that includes a backscatter reader/transmitter (BRT) hub (called a "Spider") that covers a designated area of a facility. The RFID system may, for example, be used to detect and report the presence and location of radio frequency (RF) tags across selected zones in a retail environment. The RFID system may also be used to centralize RF transmission and receiving functions to reduce the expense of recurring components. A single BRT hub ("Spider") may be used that includes antennas attached to multiple transmit and receive ports to cover a designated area of a facility. In small facilities, a single BRT hub may be used to cover the entire facility as the designated area. The Spider may, for example, be connected to AC power to eliminate the cost and maintenance of batteries, as well as allowing more read cycles, if desired. This also may permit higher wattage to be used in the transmit function, potentially increasing the size and reliability of detection zones.

In FIG. 1, a small facility 10 is shown in which the designated area 12 to be covered by a BRT hub 14 includes the entire facility. The BRT hub 14 is coupled to a plurality of transmitters (TX 1, 2) 16-18 and a plurality of receivers (RX 1-10) 20-38, for example using coaxial cable. The plurality of receivers 20-38 are positioned to provide coverage of the entire designated area 12 (the entire facility 10). Preferably, only one TX and one RX are active at a time. It will be noted that RX 22 is able to receive data from RFID tags 60, 62, and 64 at different distances in the sub-area covered by RX 22, as illustrated by concentric circles 54, 56, and 58. Also it will be noted that the transmitter TX 16 has concentric rings 48, 50, and 52 that illustrate the transmitter-to-tag zones covered by the range of transmitter TX 16, thus showing that the transmitting antenna TX 16 is positioned to illuminate at least a portion of the RFID tags (in the RX zones covered by RX 20, 22, 26, 30, 34, 36, and 38) in the designated area. In like manner, TX 18 shows corresponding concentric rings illustrating illumination coverage ranges and representing transmitter-to-tag zones covering at least a portion of the RFID tags. Between the two transmitters TX 16 and 18, all of the RFID tags in the designated area (the facility 12) are capable of illumination.

Each of the transmitters TX 16 and 18 is coupled to the BRT hub 14, for example with coaxial cable. In like manner, each of the receiver antennas in each sub-area is coupled to the BRT hub 14, for example using coaxial cable. Of course, wireless connections, or other well-known types of connections could be used instead of coaxial cable.

When the transmitting antenna 16 illuminates RFID tags within its range, one of the RF signal receiving antennas, such as RX 22, receives the modulated tag signals and conveys them to the BRT hub 14 over coaxial cable (such as 42) for transmission to a remote server. A modulated RFID tag signal may be received by more than one RX antenna when read sequentially (for example RX 26 and RX 28). In such cases, the BRT hub (Spider 14) may forward both RX events to the server, and may ascertain a location within a store using closest zone readings, received signal strength indicator (RSSI) readings, antenna intersection, or other algorithms. One preferred method is disclosed in commonly assigned copending application Ser. No. 11/418,319, entitled "Systems and Methods for Approximating the Location of an RFID Tag," filed on even date herewith, the subject matter of which is incorporated herein in full.

Figure 8:
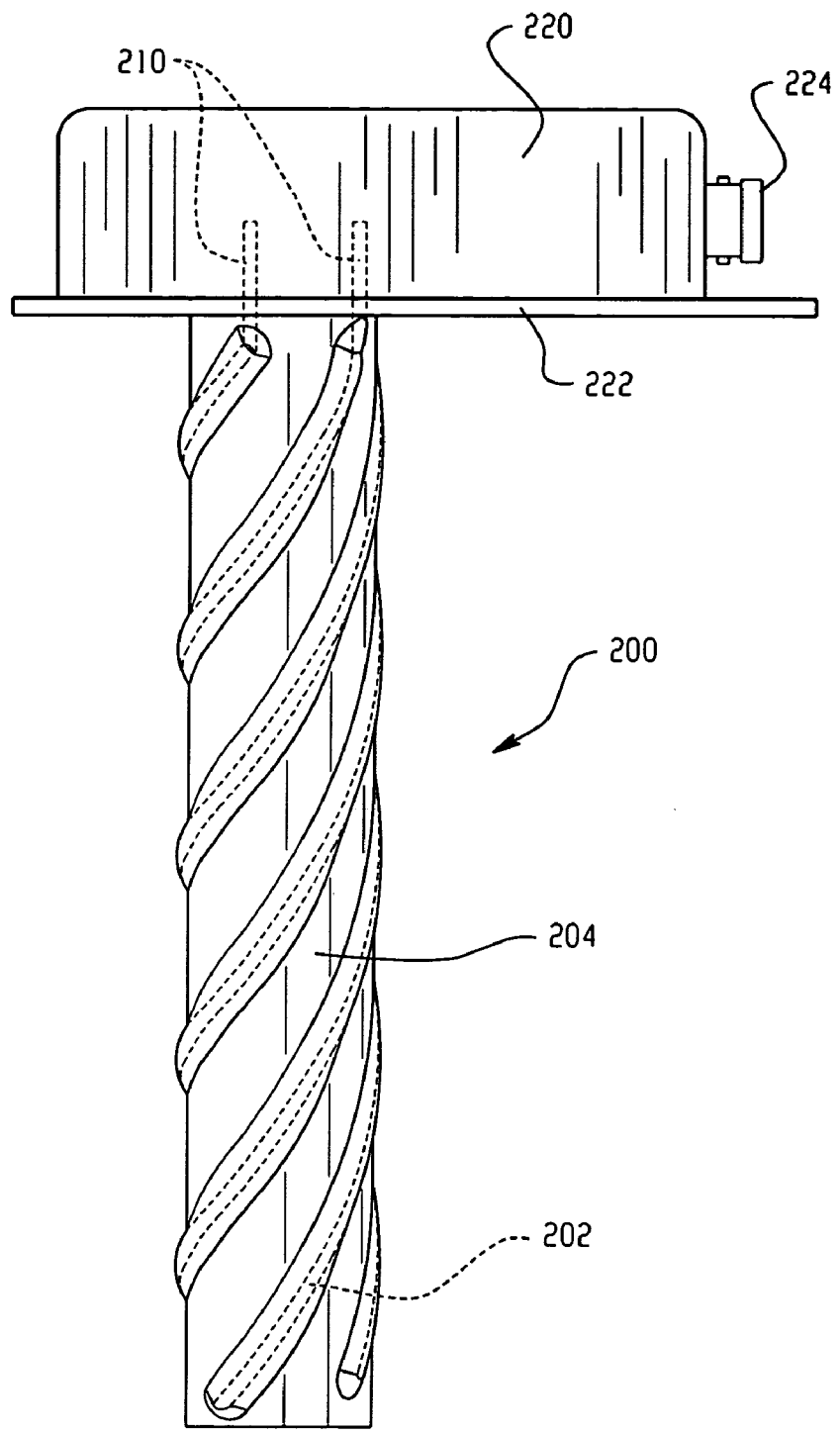
FIG. 8 depicts the example quadrifiler helix antenna attached to an amplifier circuit.

The transmitting antennas 44 and 46 associated with respective transmitters TX 16 and 18 should be omni-directional in order to illuminate tags over a large area. A shaped beam with low gain on axis and a high gain to the sides is ideal. For example, a quadrifiler helix antenna, as illustrated in FIGS. 7 and 8, may be used for the transmitting antennas 44 and 46. Quadrifiler helix antennas have been the choice in orbiting spacecraft communications for years. A quadrifiler helix antenna has circular polarization and a shaped beam for high gain when the spacecraft is farthest away on the earth's horizon, and low gain when the spacecraft is closest or overhead. Also, when used in an RFID system as described herein, the low profile of an quadrifiler antenna is equally advantageous. To a consumer or other observer in the facility, a quadrifiler helix antenna will typically look like a small white paper towel tube that hangs down a few inches vertically from the ceiling.

Typically, the transmit beam gain from TX 16 to RX 38 would be lower than the transmit beam gain from TX 16 to RX 22. Quadrifiler helix antennas are range compensating. The gain of the antenna is higher for objects farther away, which compensates for free-space power loss due to distance. This is illustrated in FIG. 5 which shows power vs. antenna angle. Higher power levels (gain) at 70 degrees are offset by the bore sight of the antenna.

Further, quadrifiler helix antennas are typically inexpensive. The antennas 44 and 46 shown in FIG. 1, for example, may be constructed of materials, such as PVC piping, #12 copper wire, and a small circuit card to maintain proper phasing between the elements. This type of antenna has been experimentally tested in a retail environment with very successful results.

Under FCC rules, part 15, a conducted RF output power of 1 Watt is allowed. The BRT's that are used in the system disclosed in commonly assigned U.S. Patent Application Publication No. 2004/0056091 are battery powered and have a maximum output power of 200 mW to conserve battery life while "illuminating" tags (e.g., reflect and receive backscatter modulated signals produced by the tags). Increasing conducted transmitter power will illuminate tags in a larger area and better illuminate tags marginally located in existing zones. The use of the quadrifiler helix antenna enables a gain of approximately 6 dbic translating into an effective isotropic radiated power (EIRP) of +36 dBm or 4 W. This is an increase of approximately 9 dB over the BRT patch antenna disclosed in the above identified published and commonly assigned co-pending patent application. This translates into an increase of 8 times the power.

The performance of an RF reader may be affected by transmitter power being coupled into the BRT receiver through the receiver antenna. The backscattered signal from the RFID tag is extremely small, and its detection can easily be overwhelmed by the backscatter transmitter carrier wave signal. Therefore, the separation of the TX antenna and the RX antenna, as shown in FIG. 1, improves performance because the deployment system allows for excellent separation.

Also, the use of the switched backscatter RFID tag (SBT) 102 shown in FIG. 6 also improves the signal communications between the SBT and the BRT. In one example, the SBT 102 has an antenna in which each side 104 and 106 of the antenna is approximately ¼λ (i.e., ¼ wavelength). In the case of a 915 MHz tag, each side is about 3.2 inches long. For a 2.45 GHz tag, these lengths would be approximately 1.2 inches long. Thus, for different frequencies the antenna lengths also would be different. A backscatter generator 110 produces a sub-carrier frequency that contains data, such as a tag ID. This backscatter signal opens and closes the RF switch 108 that connects the resonant ¼λ antenna elements 104 and 106. When the switch 108 is in the closed position, the antenna acts as a ½λ element, which is not a good receiver, and that reflects a higher percentage of the reader carrier frequency back to the reader.

When the switch 108 is in the open position, as shown, each antenna side is ¼ of the wavelength of the carrier frequency, which makes it a good receiver, and therefore absorbs more of the reader carrier frequency so it is not reflected back to the reader. This combination results in a substantial increase in the ratio of a "mark" (a 1 in binary state monitoring) to "space" (a 0 in binary state monitoring) signal received by the BRT. The increased ratio results in a dramatic improvement in the reader's ability to track the modulated signal containing the tag data across much larger distances. It also allows tags to be read more easily under marginal conditions, such as when they are close to liquid or metal (conditions well known in the art to be quite challenging for tags in the UHF band). In one example, the tag has improved performance because the antenna is T-shaped, with the antenna elements across the top of the tag, pointing out and away from other circuitry on the printed circuit board. This increases the effectiveness of the available frequency aperture and reduces antenna de-tuning.

The clean switching between "on" and "off" of a resonant aperture increases the mark-to-space ratio of the backscatter data as received by the BRT. It is this increased ratio that improves the BRT's ability to detect tags in a specific area of the store area being monitored using a carrier frequency, thereby allowing tags with a cleanly-switched resonant aperture to be detected at a much greater distance than tags without a cleanly-switched resonant aperture.

The system shown in FIG. 1 is well-suited for a small commercial sales establishment, such as a drug store, but a single Spider would likely be insufficient for larger-format retailers, such as grocery or mass merchandiser outlets. In such cases, several Spiders, each with separate Webs, could be used to cover the establishment. Connectivity to phone lines and redundant external communication electronics across multiple Spiders in a store could be circumvented by centralizing those functions into one master Spider 84. Such a system is shown in FIG. 2.

Figure 2:
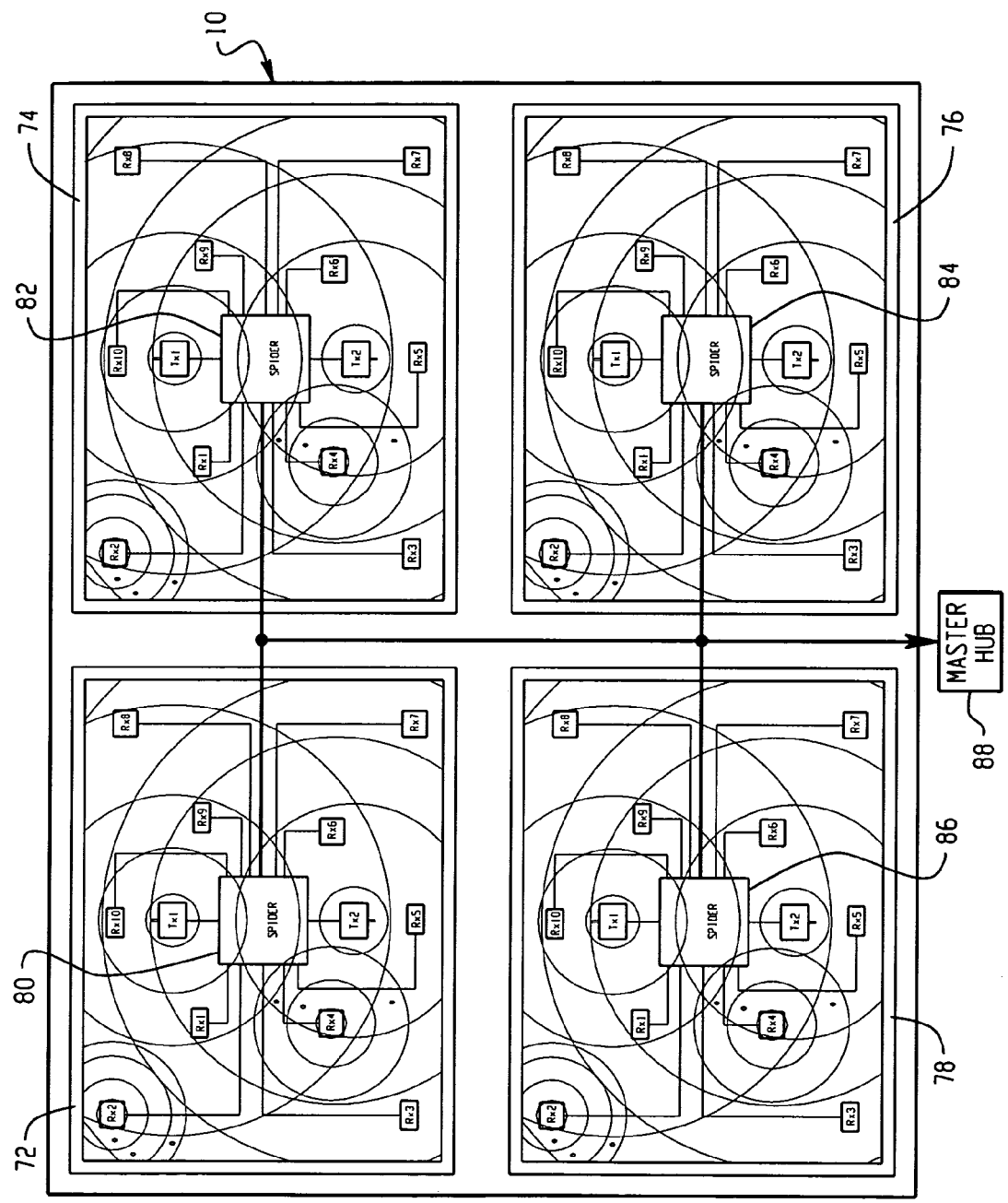
FIG. 2 depicts an example RFID system that includes a plurality of BRT hubs that are used in a plurality of designated areas to cover a larger facility.

Note in FIG. 2 that the selected location, or retail sales facility 10, is too large for one Spider. Therefore, in this example, four designated areas 72, 74, 76, and 78 are used to cover the entire facility 10. Each of the systems in each of the designated areas 72-78 is identical to the system shown in FIG. 1 and operates in an identical manner as described above. However, each of the Spiders 80, 82, 84, and 86 could be electronically coupled to a master hub 88 as shown.

Multiple Web antennae are connected to a single backscatter transmitter/receiver in the Spider, for example through coaxial cables. These coaxial cables pass through a switch matrix. This matrix and the long coaxial cables combine to create additional attenuation, thereby lowering the received signal level. To overcome this loss, a low noise amplifier (LNA) is positioned at each RX antenna. These amplifiers draw small amount of current ($\approx$15 mA) through the coaxial cable using bias tees. Locations in retail environments that are difficult or expensive to monitor via coaxial cable, such as external fuel pump signage, could still be served by the previously-designed BRT's with distributed reader/transmitter electronics by forwarding their data wirelessly to the master Spider.

FIG. 3 is a block diagram of an example quadrifiler helix antenna 90. The antenna 90 is coupled to the Spider through a coaxial cable 92 and has an associated high power amplifier 94 to recover coaxial cable signal attenuation. The antenna 90 also has an associated ISM (Industrial, Scientific, and Medical) band pass filter 96 to reduce noise or harmonics.

FIG. 4 depicts an example object 98 having an RFID tag 100 associated therewith. The object may be a permanent display, Point of Purchase (POP) temporary display, signage, advertising material, stock-alert sensors, merchandising material, category section marker, individual product, or other material desired to be monitored by retailers, manufacturers, or point-of-sale producers (collectively a "display"). The object may also be a consumer (or movable object) to which an RFID tag is associated so that the shopping (movement) pattern of the consumer can be monitored. In this manner, consumer exposure to a given display may be tracked. An RFID tag given to a consumer may, for example, be a small active transmitter tag (ATT) that uses the same frequency and protocol as the reflection from the semi-passive backscatter tags.

FIGS. 7-10 depict example circular polarized antenna configurations that may be used as transmitter and receiver antennas in an RFID system, as described herein. It has been determined that for both economic and performance reasons the optimal solution for the antennas in an RFID system is to use circular polarized antennas for the transmitters and receivers and to use linear polarized antennas for the RFID tags. The switched backscatter RFID tag (SBT), described herein, is one example of an RFID tag having a linear polarized antenna.

Using a linear polarized tag in an RFID system is typically more economical than using a tag with circular polarization. A linear polarized tag can typically be made smaller than a tag using circular polarization because a linear polarized antenna needs to operate in only one axis. However, from a system standpoint the radiation patterns of the antennas in the transmitter, receiver and tag should all be aligned or coplanar to achieve the most robust link and the best performance. This is most easily achieved in a retail environment using circular polarized antennas because maintaining coplanar antenna alignment between linear antennas in a retail environment is often impractical. A good compromise is the use of circular polarized antennas for the receivers and transmitters and linear polarized antennas for the RFID tags. In this manner, a high level of overall system performance may be maintained, while reducing the cost of the RFID tags.

FIGS. 7A and 7B depict an example transmitter antenna 200 that includes a quadrifiler helix antenna element 202. FIG. 7A is a side view of the antenna structure 200 and FIG. 7B is an exploded view in which the antenna element 202 and dielectric core 204 are depicted separately. The dielectric core 204 is a cylindrical structure formed from a non-conducting material. The antenna element 202 includes four radiating arms that are joined at a common junction 206 and that extend from the common junction in a helical pattern. In one example, the antenna element 202 may be formed from two antenna wires that are joined at the common junction 206, for instance by soldering, and that are shaped to form the four radiating arms of the quadrifiler helix structure. In another example, the two wires forming the antenna element may be in physical contact, but not mechanically joined, at the common junction 206.

In the illustrated example, the antenna structure 202 is attached to the dielectric core 204 using a plurality of holes 208 in the dielectric core 204. As illustrated in FIG. 7A, the antenna structure 202 may be attached through the holes 208 in the dielectric core 204, such that the common junction 206 is within the cylinder of the core 204 and the spiral portions of the radiating arms extend through an upper set of holes 208 and along the outside of the dielectric core 204. The four radiating arms may also extend through a lower set of holes 208 such that the four end portions 210 of the radiating arms extend from inside of the dielectric core 204. In addition, the antenna element 202 may be further secured to the dielectric core 204, as well as protected from environmental conditions, by covering the radiating arms on the outside of the core 204 with a protective material, such as a heat shrink, as shown in FIG. 7A.

FIG. 8 depicts the example quadrifiler helix antenna 200 attached to an amplifier circuit 220. As illustrated, the end portions 210 of the antenna element 202 may extend through a dielectric material 222, such as a printed circuit board, to couple the antenna 202 to the amplifier circuit 220. The dielectric material 222 may also incorporate an antenna backplane (e.g., a metallic surface) to shield the antenna 202 from the amplifier circuit 220 and to provide directivity to the circular polarized radiation pattern of the helical antenna element 202.

The amplifier circuit 220 may, for example, be attached to the ceiling of a retail environment such that the antenna 200 extends downwardly from the ceiling. In addition, the amplifier circuit 220 may be coupled to other components in the RFID system via an external connector 224, such as a coaxial cable connector. In one example, the amplifier circuit 220 may include two or more gain settings that may be used to tune the amplifier circuit 220 for use in different sized retail environments. For example, a higher gain setting for the amplifier 220 may be used for a larger retail environment.

Figure 9B:
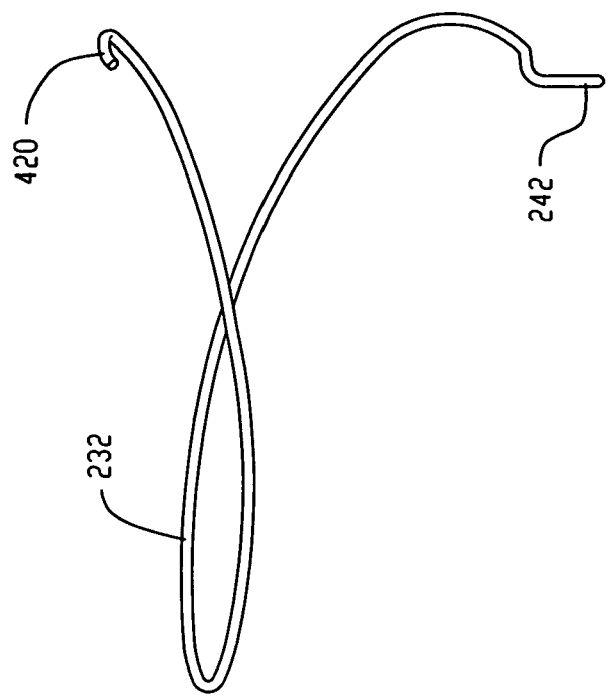
FIGS. 9A and 9B depict an example receiver antenna having a single turn helix antenna element.
Figure 9A:
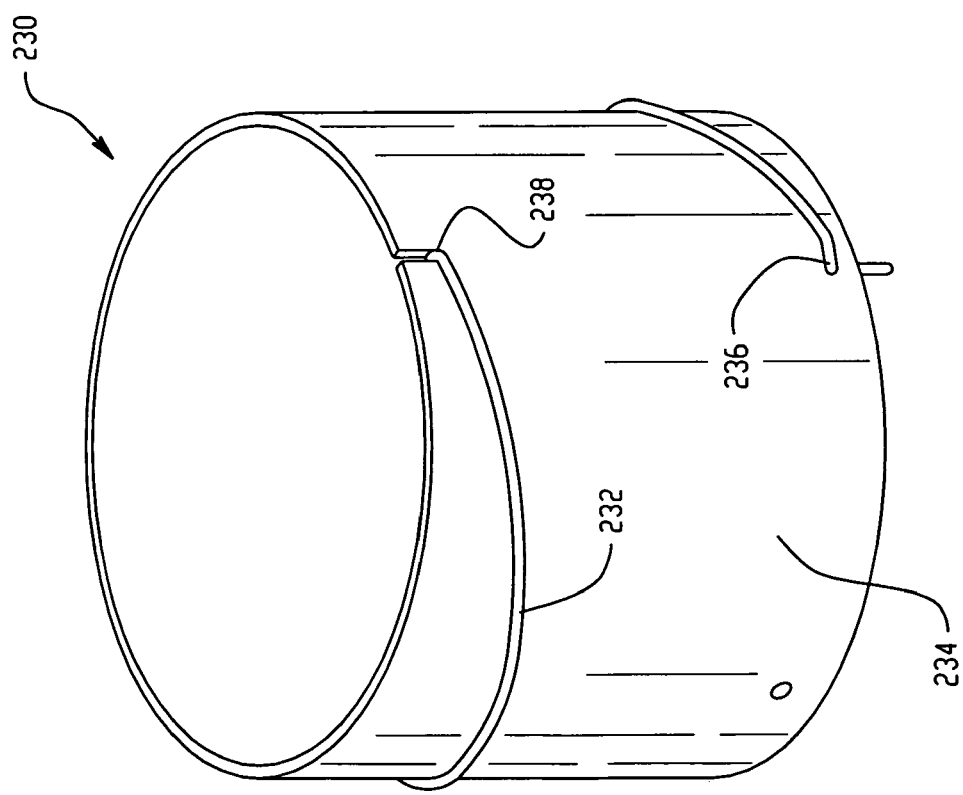

FIGS. 9A and 9B depict an example receiver antenna 230 that includes a single turn helix antenna element 232. FIG. 9A is a prospective view of the antenna structure 230 showing both the antenna element 232 and the dielectric core 234, and FIG. 9B shows only the antenna element 232. The dielectric core 234 is a cylindrical structure formed from a non-conducting material. In the illustrated example, the antenna element 232 is attached to the dielectric structure 234 using a hole 236 in a bottom portion of the dielectric core 234 and a slot 238 in an upper portion of the core 234. As illustrated in FIG. 9A, an upper end portion 240 of the antenna element 232 may extend trough the slot 238 and a lower end portion 242 of the antenna element 232 may extend through the hole 236, such that the spiral portion of the antenna element extends along the outside of the dielectric core 234.

Figure 10:
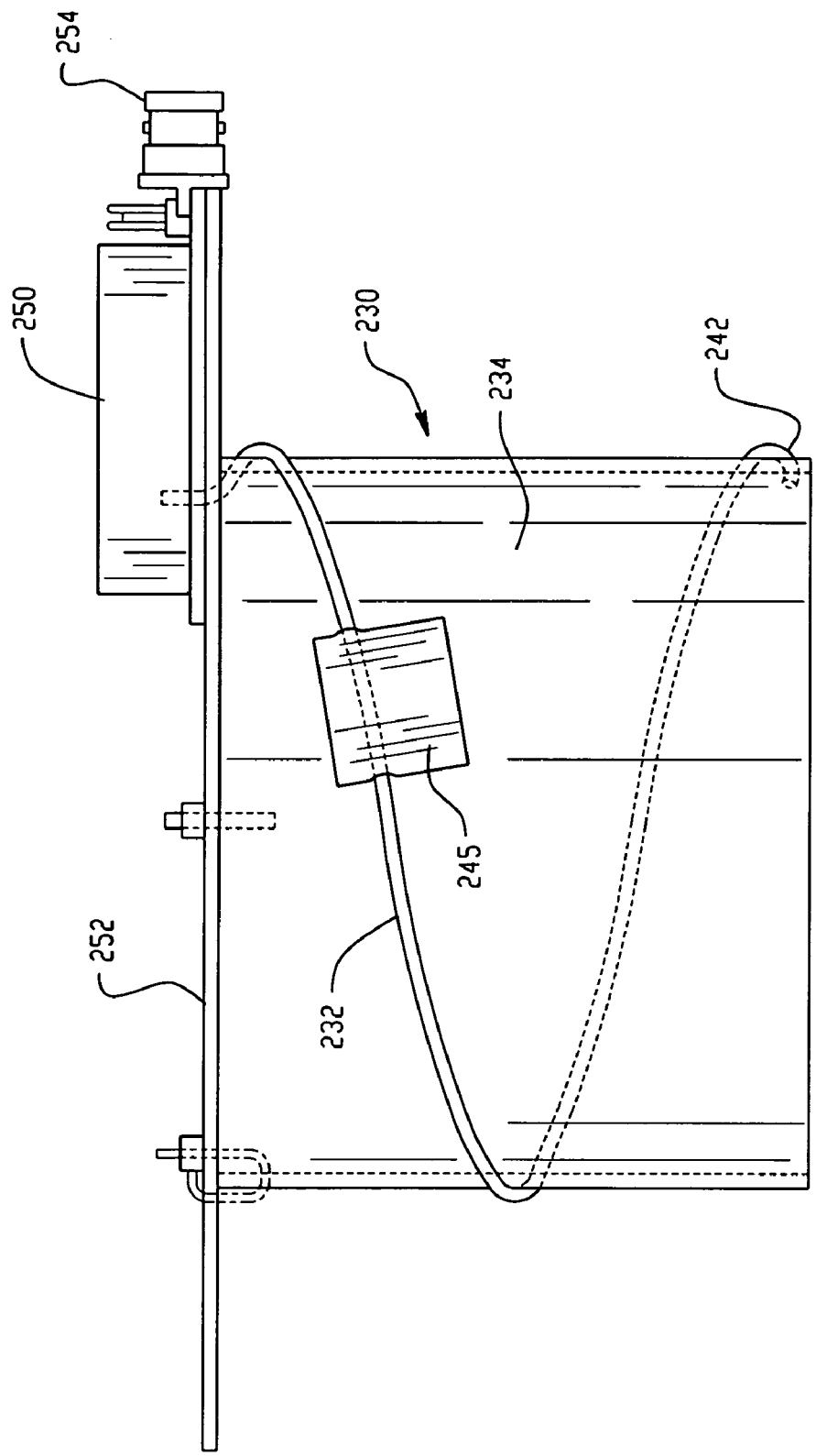
FIG. 10 depicts the example single turn helix antenna attached to an amplifier circuit.

FIG. 10 depicts the example single turn helix antenna 230 attached to an amplifier circuit 250. As illustrated, the lower end portion 242 of the antenna element 232 may extend through a dielectric material 252, such as a printed circuit board, to couple the antenna 232 to the amplifier circuit 250. The dielectric material 252 may also incorporate an antenna backplane (e.g., a metallic surface) to shield the antenna 232 from the amplifier circuit 250 and to provide directivity to the circular polarized radiation pattern of the helical antenna structure 232. FIG. 10 also illustrates a conductive patch 245 that may be included to tune the antenna and possibly to help adhere the antenna element 232 to the dielectric material 252. The element 232 may be adhered to the outside of the patch 245.

The amplifier circuit 250 may, for example, be located in the ceiling of a retail environment, for example above the ceiling tiles. In addition, the amplifier circuit 250 may be coupled to other components in the RFID system via an external connector 254, such as a coaxial cable connector.

Figure 11:
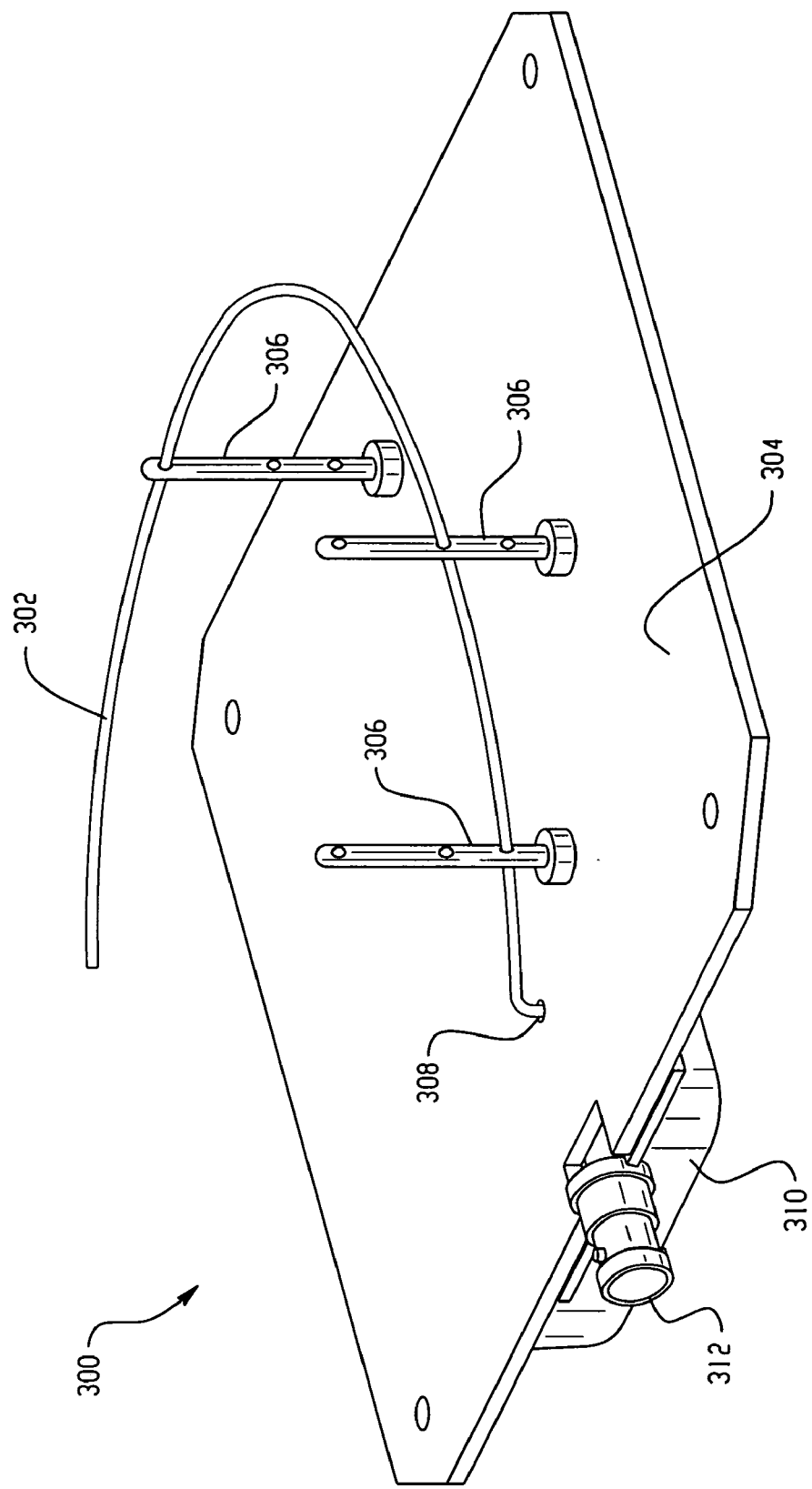
FIGS. 11-13 depict another receiver antenna embodiment that includes a single turn helix antenna element.

FIG. 11 depicts another preferred embodiment of receiver antenna 300 that includes a single turn helix antenna element 302. In this example, the antenna element 302 is not supported by a dielectric core. Rather, the antenna element 302 is attached to a dielectric material 304, such as a printed circuit board, using a plurality of support structures 306 made of a dielectric material, such as plastic. In addition, an end portion of the antenna element 302 is coupled to an amplifier circuit 310 through a hole 308 in the dielectric material 304. The dielectric material 304 may also incorporate an antenna backplane (e.g., a metallic surface) to shield the antenna element 302 from the amplifier circuit 310 and to provide directivity to the circular polarized radiation pattern of the helical antenna structure 302. Also illustrated is a connector 312, such as a coaxial cable connector, for coupling the amplifier circuit 310 to other components in the RFID system. In one example, the antenna element 302 may be about 1λ in length with a pitch of about 0.2 λ The openings 307 in the supports 306 serve to fix the pitch at the beginning portion of the element 302 at its critical beginning location.

Figure 12:
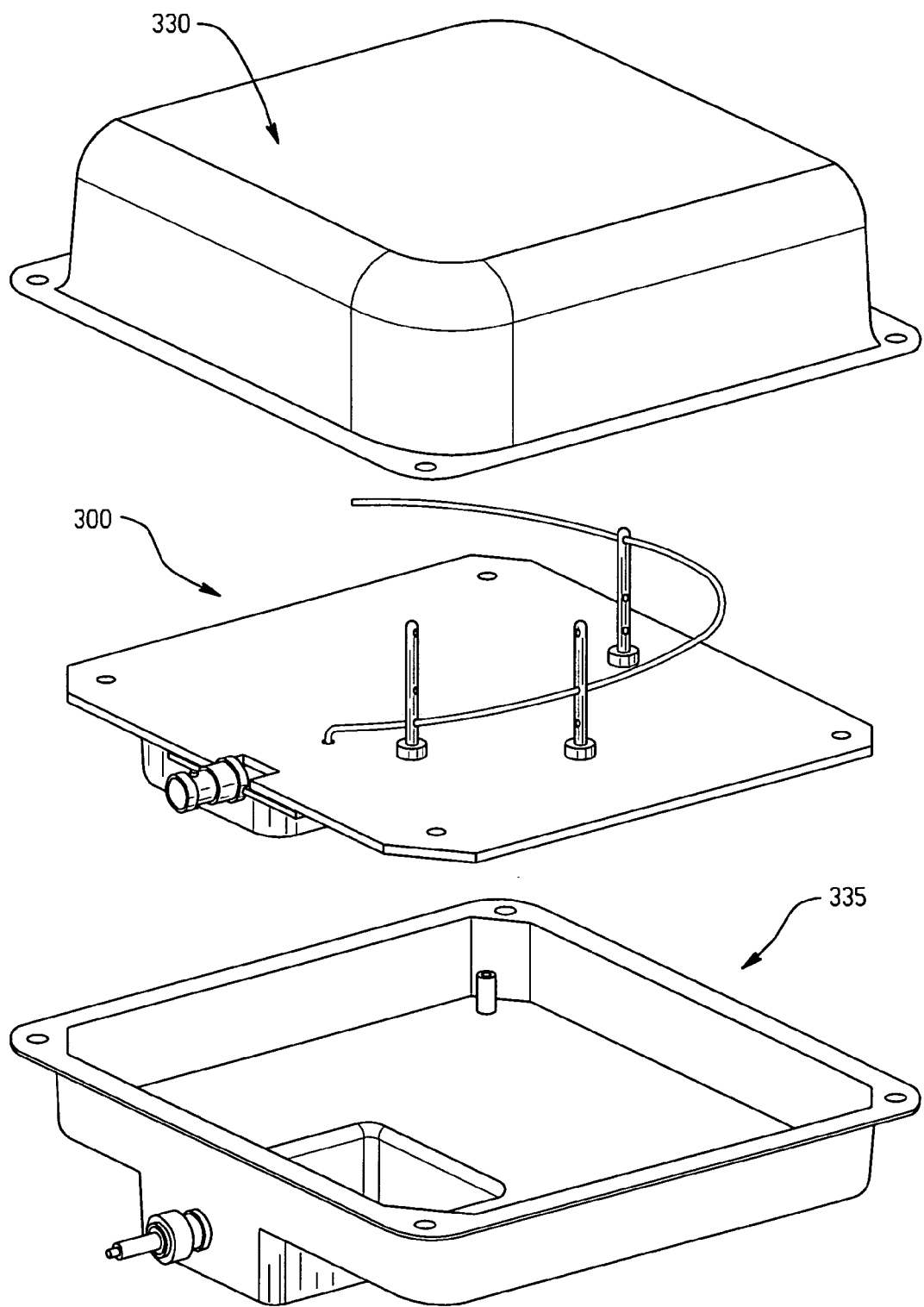
Figure 13:
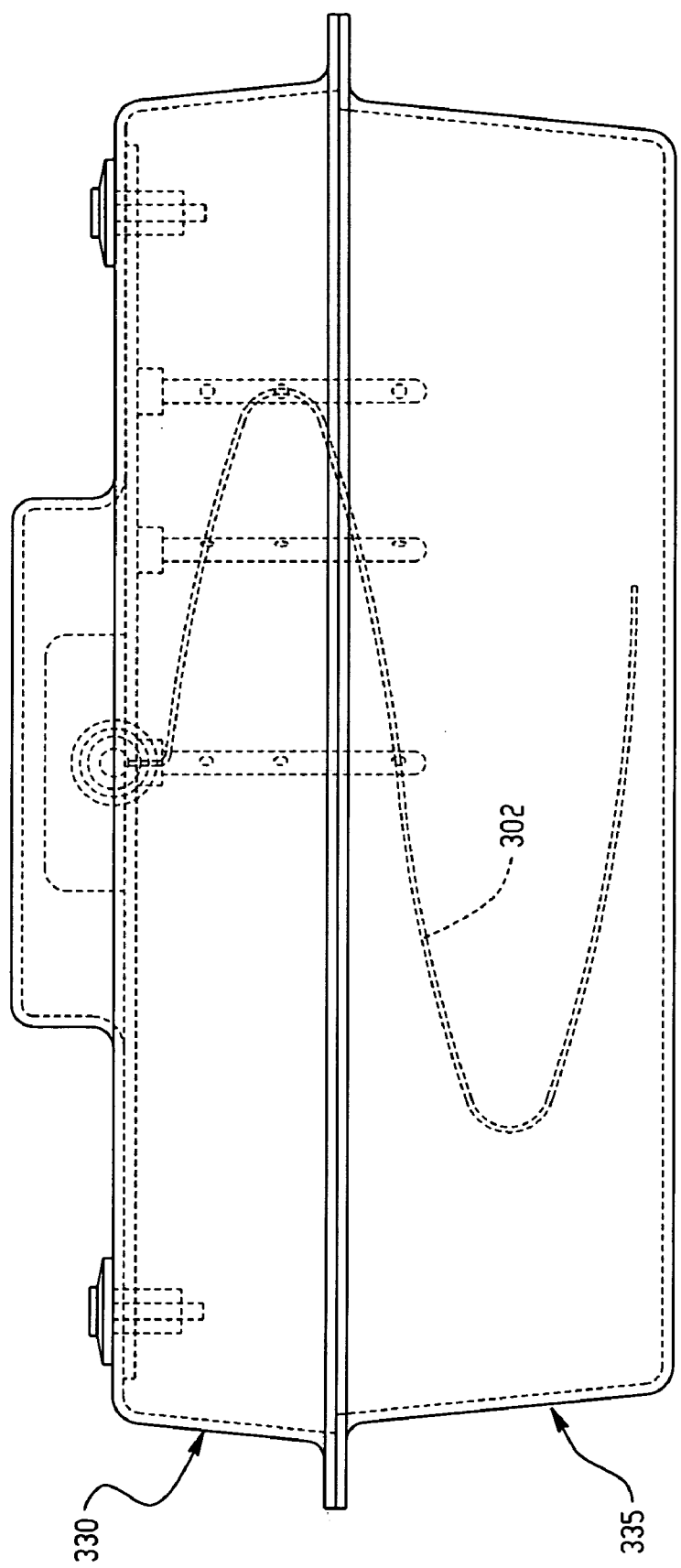

FIG. 12 is an exploded view of an example enclosure 330, 335 for housing the receiver antenna 300. The antenna housing 330, 335 may, for example, be secured in the ceiling of a retail environment, for example above the ceiling tiles. FIG. 13 shows how the antenna structure 302 fits within the housing portions 330, 335.

This written description uses examples to disclose the invention, including the best mode, and also to enable a person skilled in the art to make and use the invention. The patentable scope of the invention may include other examples that occur to those skilled in the art.

It is claimed:

1. A radio frequency identification (RFID) system, comprising:
    a plurality of RFID tags, each of the plurality of RFID tags including a linear polarized antenna for communicating an RFID tag signal;
    at least one receiver antenna for receiving the RFID tag signals, the receiver antenna including a circular polarized helical antenna element;
    an RFID tag signal reader coupled to the at least one receiver antenna that processes the RFID tag signals;
    a transmitter antenna for transmitting an RF signal to the RFID tag, the transmitter antenna including a circular polarized quadrifiler helical antenna element; and
    a transmitter coupled to the at least one transmitter antenna that generates the RF signal;
    wherein the RFID tag communicates the RFID tag signal in response to receiving the RF signal from the transmitter antenna;
    wherein the plurality of RFID tags include a first tag and a second tag, the transmitter antenna being configured to apply a first gain on axis to the first tag and a second gain to the side of axis to the second tag, where the second gain is greater than the first gain.

2. The system of claim 1, wherein the receiver antenna is a single turn helix antenna.

3. The system of claim 1, wherein the transmitter antenna is a single turn quadrafilar helix antenna.

4. The system of claim 1, wherein the RF signal transmitted by the transmitter antenna includes a carrier wave that is modulated by the RFID tag to generate the RFID tag signal.

5. The system of claim 2, wherein the receiver antenna includes:
    a dielectric core; and
    an antenna element having a single radiating arm that extends in a spiral pattern around the dielectric core.

6. The system of claim 5, wherein the receiver antenna further includes an antenna backplane that adds directivity to a circular polarized radiation pattern of the antenna element.

7. The system of claim 5, wherein the receiver antenna further includes an amplifier circuit coupled to the antenna element.

8. The system of claim 2, wherein the receiver antenna includes:
    a dielectric structure; and
    an antenna element having a single radiating arm that is attached to the dielectric structure using one or more support structures.

9. The system of claim 8, wherein the receiver antenna further includes an antenna backplane that adds directivity to a circular polarized radiation pattern of the antenna element.

10. The system of claim 8, wherein the receiver antenna further includes an amplifier circuit coupled to the antenna element.

11. The system of claim 3, wherein the transmitter antenna includes:
    a dielectric core; and
    an antenna element attached to the dielectric core, the antenna element including four radiating arms that extend in a helical pattern from a common junction.

12. The system of claim 11, wherein the four radiating arms are formed from two antenna wires that are bonded at the common junction.

13. The system of claim 11, wherein the transmitter antenna further includes an antenna backplane that adds directivity to a circular polarized radiation pattern of the antenna element.

14. The system of claim 11, wherein the transmitter antenna further includes an amplifier circuit coupled to the antenna element.

15. The system of claim 1, wherein the transmitter and the RFID tag signal reader are included in a single reader/transmitter unit.

16. The system of claim 4, wherein the linear polarized antenna includes:
    a first antenna element;
    a second antenna element; and a switching circuit for selectively coupling the first antenna element with the second antenna element;
when coupled together by the switching circuit, the first and second antenna elements forming a single antenna element that reflects the RF signal transmitted by the transmitter antenna; and
when not coupled together by the switching circuit, the first and second antenna elements absorbing at least a portion of the RF signal transmitted by the transmitter antenna.

17. The system of claim 1, wherein the RFID tag signal reader processes the RFID tag signals to determine an identification associated with the RFID tag and encoded in the RFID tag signal.

18. The system of claim 1, wherein the RFID tag signal reader processes the RFID tag signals to determine a location of the RFID tags.

19. The system of claim 1, wherein the RFID tag signal reader processes the RFID tag signals to determine an amount of time that the RFID tags are present within a facility.

20. A distributed radio frequency identification (RFID) antenna array system, comprising:
at least one transmitter antenna for transmitting RF signals, the transmitter antenna including a circular polarized quadrifiler helical antenna element;
a plurality of RFID tags, each of the plurality of RFID tags including a linear polarized antenna for receiving the RF signals and for transmitting RFID tag signals, the RFID tag signals being transmitted by the at least one of said plurality of RFID tags in response to receiving the RF signals;
a plurality of receiver antennas for receiving the RFID tag signals from the at least one RFID tag; and
a single reader/transmitter unit coupled to the at least one transmitter antenna and the plurality of receiver antennas, the reader/transmitter unit generating the RF signals for transmission by the at least one transmitter antenna and processing the RFID tag signals received by the plurality of receiver antennas;
wherein the distributed RFID antenna array system is included within a designated area of a retail facility, the designated area including a plurality of sub-areas;
wherein the plurality of RFID tags are located in the designated area with multiple RFID tags being located in each of the plurality sub-areas;
wherein one of the plurality of receiver antennas is located in each of the plurality of sub-areas;
wherein the at least one transmitter antenna is positioned to illuminate a plurality of RFID tags in each of the plurality of sub-areas with RF signals causing the one receiver antenna in each of the plurality of sub-areas to receive RFID tag signals from illuminated RFID tags; and
wherein the at least one transmitter antenna is configured to apply a first gain on axis of the circular polarized quadrifiler helical antenna element and to apply a second gain off axis of the circular polarized quadrifiler helical antenna element, where the first gain is less than the second gain.

21. The system of claim 20, wherein the RF signals transmitted by the transmitter antenna include carrier waves that are modulated by the plurality of RFID tags to generate the RFID tag signals.

22. The system of claim 20, wherein the transmitter antenna includes a single turn quadrifiler helix antenna.

23. The system of claim 21, wherein the linear polarized antenna in the plurality of RFID tags includes:
a first antenna element;
a second antenna element; and
a switching circuit for selectively coupling the first antenna element with the second antenna element;
when couple together by the switching circuit, the first and second antenna elements forming a single antenna element that reflects the RF signals transmitted by the transmitter antenna;
when not coupled together by the switching circuit, the first and second antenna elements absorbing at least a portion of the RF signals transmitted by the transmitter antenna.

24. A distributed radio frequency identification (RFID) antenna array system, comprising:
at least one transmitter antenna for transmitting RF signals, the transmitter antenna including a circular polarized helical antenna element;
a plurality of RFID tags, each RFID tag including a linear polarized antenna for receiving the RF signals and for transmitting RFID tag signals, the RFID tag signals being transmitted by the RFID tags in response to receiving the RF signals;
a plurality of receiver antennas for receiving the RFID tag signals from the RFID tags; and
means for generating the RF signals for transmission by the at least one transmitter antenna; and
means for processing the RFID tag signals received by the plurality of receiver antennas;
wherein the distributed RFID antenna array system is included within a designated area of a retail facility, the designated area including a plurality of sub-areas;
wherein the plurality of RFID tags are located in the designated area with multiple RFID tags being located in each of the plurality of sub-areas;
wherein one of the plurality of receiver antennas is located in each of the plurality of sub-areas;
wherein the at least one transmitter antenna is positioned to illuminate RFID tags in each of the plurality of sub-areas with RF signals causing the one receiver antenna in each of the plurality of sub-areas to receive RFID tag signals from illuminated tags; and
wherein the at least one transmitter antenna is configured to apply a first gain on axis of the circular polarized quadrifiler helical antenna element and to apply a second gain off axis of the circular polarized quadrifiler helical antenna element, where the first gain is less than the second gain.

25. The system of claim 24, wherein at least one of the plurality of RFID tags is a switched backscatter RFID tag.

26. The system of claim 25, wherein the switched backscatter RFID tag comprises:
a first antenna segment;
a second antenna segment;
means for coupling the first antenna segment to the second antenna segment to reflect the RF signals; and
means for decoupling the first antenna segment from the second antenna segment to absorb the RF signals.

* * * * *

UNITED STATES PATENT AND TRADEMARK OFFICE
CERTIFICATE OF CORRECTION

PATENT NO. : 7,614,556 B2  Page 1 of 1
APPLICATION NO. : 11/417768
DATED : November 10, 2009
INVENTOR(S) : Overhultz et al.

It is certified that error appears in the above-identified patent and that said Letters Patent is hereby corrected as shown below:

In column 8, line 17, claim 3 delete "quadrafilar" and insert -- quadrafiler --.

In column 10, line 9, claim 23 delete "couple" and insert -- coupled --.

In column 10, line 20, claim 24 insert -- quadrafiler -- before "helical".

Signed and Sealed this

Eighth Day of December, 2009

David J. Kappos
*Director of the United States Patent and Trademark Office*